(No Model.)
F. BURCKHARDT.
GRAIN HULLER.
No. 313,989. Patented Mar. 17, 1885.
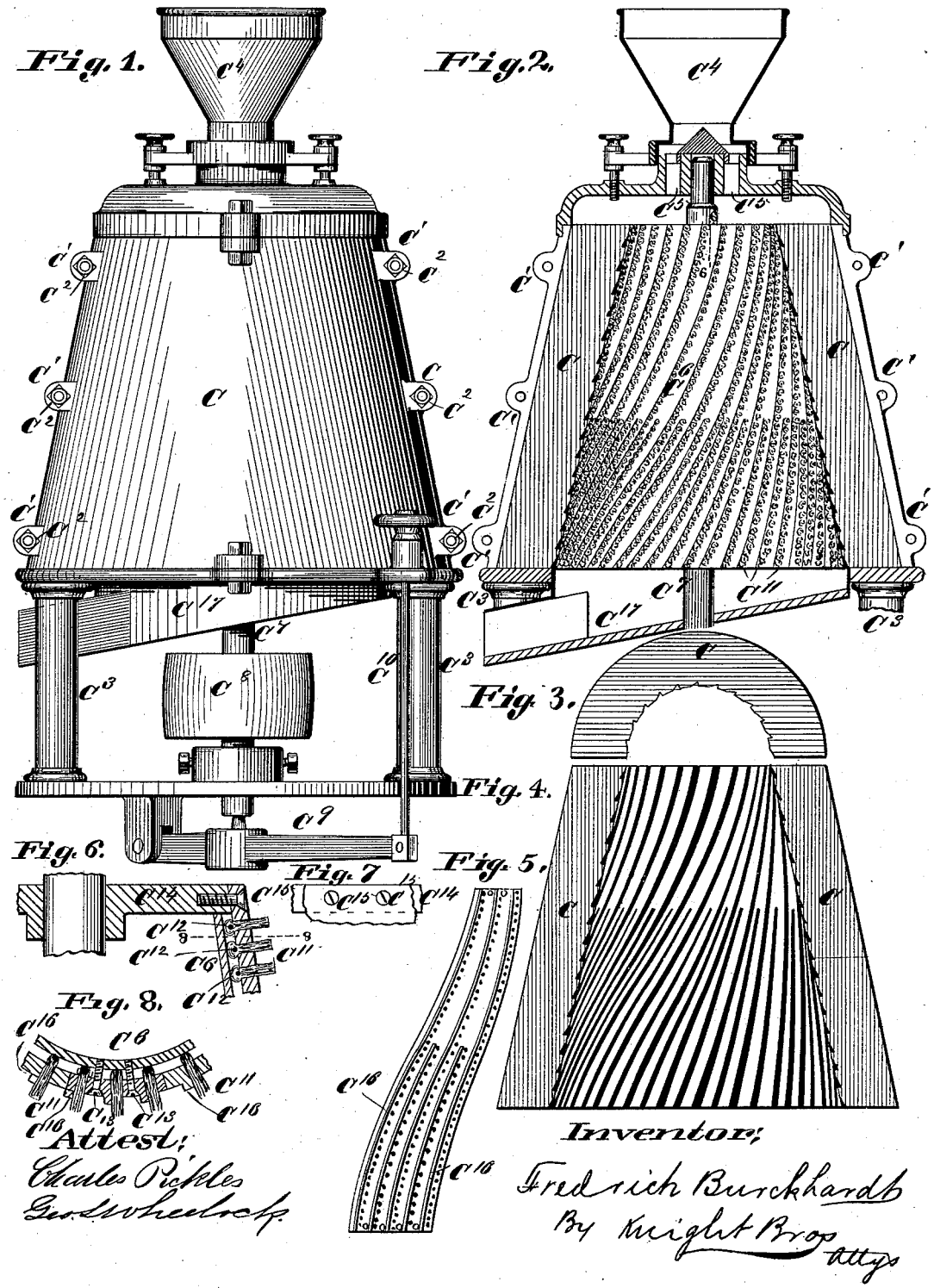

UNITED STATES PATENT OFFICE.

FREDRICH BURCKHARDT, OF ST. CHARLES, MISSOURI.

GRAIN-HULLER.

SPECIFICATION forming part of Letters Patent No. 313,989, dated March 17, 1885.

Application filed December 31, 1883. Renewed November 26, 1884. (No model.)

*To all whom it may concern:*

Be it known that I, FREDRICH BURCKHARDT, of St. Charles, in the county of St. Charles and State of Missouri, have invented certain new and useful Improvements in Grain-Hullers, of which the following is a full, clear, and exact description, reference being had to the accompanying drawings, forming part of this specification, and in which—

Figure 1 is a side elevation of the huller. Fig. 2 is a sectional elevation of one-half of the hollow conical hulling-stone, showing the brush-cone in side view. Fig. 3 is a top view of one-half of the hollow conical hulling-stone. Fig. 4 is an elevation of same, showing the interior thereof. Fig. 5 is an elevation of one of the plates of the brush-cone. Fig. 6 is a detail vertical section taken on line 6 6, Fig. 2. Fig. 7 is a detail view of the upper end of the brush-cone, showing the manner of securing the plates to the top and bottom disks. Fig. 8 is a horizontal section taken on line 8 8, Fig. 6.

This invention relates to an apparatus more particularly intended for use in hulling corn in the manufacture of hominy, grits, &c.; and it consists in features of novelty hereinafter fully described, and pointed out in the claims.

Referring to the drawings, C represents a hollow conical hulling-stone, its interior being furrowed as shown in Figs. 3 and 4, and its lower portion preferably has double the number of furrows that the upper portion has for the purpose of increasing the number of grinding or breaking edges. The hollow conical hulling-stone is made in two parts, provided with lugs $C'$, secured together by bolts $C^2$, passing through the lugs, and it (the hollow conical hulling-stone) is supported by suitable posts, $C^3$, or other suitable means.

On top of the hollow conical hulling-stone is a hopper, $C^4$, from which the corn enters the eye of the stone through openings $C^5$.

Within the hollow conical hulling-stone is a brush cone or runner, $C^6$, supported on a shaft, $C^7$, provided with a driving-pulley, $C^8$, and an adjusting-lever and screw, $C^9$ $C^{10}$.

The ribs $C^{11}$ on the brush-cone, which act to hull and break the corn, are made of metallic brushes, as represented in Figs. 6 and 8, arranged in spiral form and held in place by the material from which they are made, being bent and passed through perforated plates, one section being shown in Fig. 5, and held from coming out by wires $C^{12}$, and held from going in by the inner shell of the cone, to which the perforated plates are secured by screws $C^{13}$. (See Fig. 8.) The perforated plates or sections are secured to upper and lower disks, $C^{14}$, by screws $C^{15}$. (See Figs. 6 and 7.) These disks are perforated in their centers to receive the shaft of the brush cone, to which they are secured.

The plates or sections are provided with ribs $C^{16}$ back of each row of perforations, which form backings to the metallic brushes, supporting and making them more rigid.

The number of the brush-ribs on the lower part of the cone are increased, as shown in Fig. 2, for the purpose of giving a greater hulling-surface. $C^{17}$ represents the spout of the mill for receiving the discharge.

A machine similar to the one herein shown and described, but having the inner surface of the hollow conical hulling-shell provided with tufts instead of being milled or corrugated, as in the present case, is shown and described in my application No. 137,236, filed on the 9th July, 1884.

I claim as my invention—

1. The combination, in a grain-huller, of a hopper, a hollow conical hulling-stone having spiral furrows increasing in number toward the bottom, and a brush cone or runner having ribs consisting of brushes, increasing in number toward the bottom, all substantially as set forth.

2. The combination of the hollow conical hulling-stone, the brush-cone consisting of a shell, sectional perforated ribbed plates, upper and lower disks and brushes arranged spirally and forming the hulling-ribs, and the driving-shaft, substantially as set forth.

FREDRICH BURCKHARDT.

In presence of—
JNO. POWELL,
R. S. NELSON.